(12) United States Patent
Luo et al.

(10) Patent No.: US 12,444,128 B2
(45) Date of Patent: Oct. 14, 2025

(54) HAIR RENDERING SYSTEM BASED ON DEEP NEURAL NETWORK

(71) Applicant: SHANGHAITECH UNIVERSITY, Shanghai (CN)

(72) Inventors: Haimin Luo, Shanghai (CN); Minye Wu, Shanghai (CN); Lan Xu, Shanghai (CN); Jingyi Yu, Shanghai (CN)

(73) Assignee: SHANGHAITECH UNIVERSITY, Shanghai (CN)

( * ) Notice: Subject to any disclaimer, the term of this patent is extended or adjusted under 35 U.S.C. 154(b) by 216 days.

(21) Appl. No.: 18/281,966

(22) PCT Filed: Apr. 13, 2021

(86) PCT No.: PCT/CN2021/087069
§ 371 (c)(1),
(2) Date: Sep. 14, 2023

(87) PCT Pub. No.: WO2022/217470
PCT Pub. Date: Oct. 20, 2022

(65) Prior Publication Data
US 2024/0161388 A1  May 16, 2024

(51) Int. Cl.
*G06T 15/20* (2011.01)
*G06T 7/593* (2017.01)
*G06T 7/62* (2017.01)
*G06T 17/00* (2006.01)

(52) U.S. Cl.
CPC ............ *G06T 15/20* (2013.01); *G06T 7/596* (2017.01); *G06T 7/62* (2017.01); *G06T 17/00* (2013.01); *G06T 2200/04* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

2020/0349711 A1  11/2020  Oreal
2022/0051485 A1*  2/2022  Martin Brualla ..... G06T 15/005

FOREIGN PATENT DOCUMENTS

CN  112183727 A  1/2021

OTHER PUBLICATIONS

Haimin Luo, et al., Convolutional Neural Opacity Radiance Fields, 2021 IEEE International Conference on Computational Photography (ICCP), 2021.
Cen Wang, et al., Neural Opacity Point Cloud, IEEE Transactions On Pattern Analysis and Machine Intelligence, 2020.
(Continued)

*Primary Examiner* — Frank S Chen
(74) *Attorney, Agent, or Firm* — Bayramoglu Law Offices LLC

(57) ABSTRACT

A deep neural network based hair rendering system is presented to model high frequency component of furry objects. Compared with existing approaches, the present method can generate photo-realistic rendering results. An acceleration method is applied in our framework, which can speed up training and rendering processes. In addition, a patch-based training scheme is introduced, which significantly increases the quality of outputs and preserves high frequency details.

22 Claims, 4 Drawing Sheets

(56) References Cited

OTHER PUBLICATIONS

Minye Wu, et al., Muiti-view Neural Human Rendering, 2020 IEEE/CVF Conference on Computer Vision and Pattern Recognition (CVPR), 2020, pp. 1679-1688.

Qiqi Hou, Context-Aware Image Matting for Simultaneous Foreground and Alpha Estimation, 2019.

* cited by examiner

HAIR RENDERING SYSTEM BASED ON DEEP NEURAL NETWORK

CROSS REFERENCE TO THE RELATED APPLICATIONS

This application is the national phase entry of International Application No. PCT/CN2021/087069, filed on Apr. 13, 2021, the entire contents of which are incorporated herein by reference.

TECHNICAL FIELD

This invention relates generally to the field of computer graphics, and more specifically, to a rendering system based on deep neural network.

BACKGROUND

With the recent development of active and passive 3D scanning technology, high-quality 3D reconstruction of complex objects has become more and more accessible, and the reconstruction quality has also been improved. However, reconstructing natural and accurate surface is still a challenge. The most recent solutions either rely on very complex lighting systems and data processing techniques, or require significant human involvement to fit the parametric surface model to the actual object. One particularly challenging example is the reconstruction of furry objects, such as hair, fur, and leather. These objects exhibit a property that their transparency changes along with the change of viewpoint. Therefore, it is difficult to simultaneously model their geometry and surface, and to render high-quality pictures of such furry objects.

In the field of image rendering, the existing image-based modeling and rendering methods (such as the IBOH method) use a view-dependent volumetric representation to model furry objects, which can only be obtained under ultra-dense cameras setting. Therefore, the cost is high and the operation is complicated. In the traditional field of computer graphics, rendering high-quality furry objects takes a significant amount of time and usually requires experienced experts to manually create a fine three-dimensional hair model, so there are high industry barriers and creation costs. It is also difficult for the created model to be truly conform to people's perception of furry objects.

It is to be noted that the above information disclosed in this Background section is only for facilitating the understanding of the background of this invention, and therefore may contain information that is already known to a person of ordinary skill in the art.

SUMMARY

In view of the limitations of existing technologies described above, the present invention provides a hair rendering system based on deep neural network that addresses the aforementioned limitations. Additional features and advantages of this invention will become apparent from the following detailed descriptions.

One aspect of the present invention is directed to a method of rendering an object. The method may comprise capturing a plurality of images of the object from a plurality of views, obtaining an alpha mask for each image, obtaining a 3D proxy geometry through a structure from silhouette algorithm, rendering a depth map for each image using the 3D proxy, training a neural radiance field-based (NeRF-based) deep neural network with images with depth, and rendering a plurality of images for a plurality of new views.

In an exemplary embodiment of the present disclosure, the method may further comprise training the neural radiance field-based (NeRF-based) deep neural network with pixels in the area of the image with depth.

In an exemplary embodiment of the present disclosure, a near bound $t_n$ of the area may be calculated by $t_n = d_s - d_f * d_r$. And a far bound $t_f$ of the area may be calculated by $t_f = d_s + d_f (1-d_r)$. $d_s$ is the depth of the image, $d_f$ is a sampling range, and $d_r$ is the ratio of sampling numbers.

In an exemplary embodiment of the present disclosure, $d_f$ and $d_r$ may be set based on the nearest depth and farthest depth rendered using the 3D proxy.

In an exemplary embodiment of the present disclosure, the pixels in the images with depth used in training may comprise no more than 10% of the pixels in the plurality of images.

In an exemplary embodiment of the present disclosure, the method may further comprise dividing the images with depth into a plurality of patches and training the neural radiance field-based (NeRF-based) deep neural network with the images with depth in the patch with a perceptual loss function for supervision.

In an exemplary embodiment of the present disclosure, the method may further comprise training the neural radiance field-based (NeRF-based) deep neural network using RGB supervision and alpha supervision using a loss function.

In an exemplary embodiment of the present disclosure, the neural radiance field-based (NeRF-based) deep neural network may comprise a multi-layer UNet convolutional network.

In an exemplary embodiment of the present disclosure, the neural radiance field-based (NeRF-based) deep neural network may comprise a generative adversarial network. And the method may further comprise training the generative adversarial network using RGB supervision using a loss function.

In an exemplary embodiment of the present disclosure, the method may further comprise training the generative adversarial network using RGB supervision and pseudo-supervision using a loss function.

In an exemplary embodiment of the present disclosure, the object may comprise hair.

BRIEF DESCRIPTION OF THE DRAWINGS

The accompanying drawings, which are incorporated in and constitute a part of the description, illustrate embodiments consistent with this invention and, together with the description, serve to explain the disclosed principles. It is apparent that these drawings present only some embodiments of this invention and those of ordinary skill in the art may obtain drawings of other embodiments from them without exerting any creative effort.

DETAILED DESCRIPTION OF THE EMBODIMENTS

Figure 1:
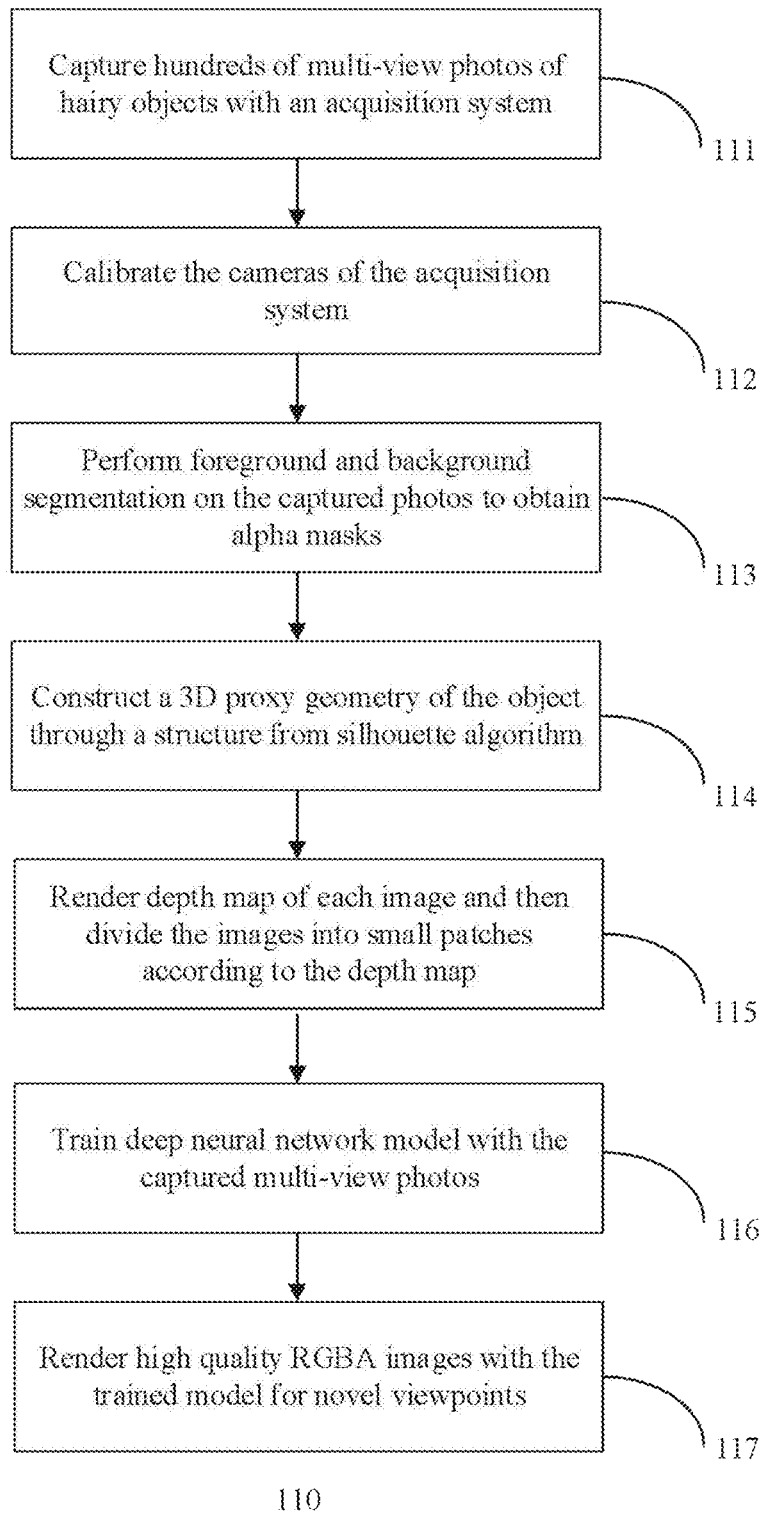
FIG. 1 is an exemplary flow chart showing the hair rendering system pipeline in accordance with one embodiment of the present invention.

Exemplary embodiments will now be described more fully with reference to the accompanying drawings. However, these exemplary embodiments can be implemented in many forms and should not be construed as being limited to those set forth herein. Rather, these embodiments are presented to provide a full and thorough understanding of this invention and to fully convey the concepts of the exemplary embodiments to others skilled in the art.

In addition, the described features, structures, and characteristics may be combined in any suitable manner in one or more embodiments. In the following detailed description, many specific details are set forth to provide a more thorough understanding of this invention. However, those skilled in the art will recognize that the various embodiments can be practiced without one or more of the specific details or with other methods, components, materials, or the like. In some instances, well-known structures, materials, or operations are not shown or not described in detail to avoid obscuring aspects of the embodiments.

The present invention presents a furry object rendering system based on deep neural network, which can be used to address the issue of free viewpoint rendering of furry objects from sparse viewing angles, with comprehensive considerations of the physical properties of furry objects such as color, material, texture, and transparency. In the embodiments of the present invention, physical modeling may be performed, and the view-dependent rendering of high-definition color furry objects may be realized. Also, an alpha map that conforms to the physical rules may be simultaneously generated. The embodiments of the present invention may be divided into the following parts: (1) taking hundreds of high-definition photos of furry objects with a ring-shaped multi-lens camera acquisition system; (2) performing foreground and background segmentation on the captured photos to obtain rough foreground masks, (the objects needs to be in the mask in each perspective); (3) obtaining a rough three-dimensional proxy through the structure from silhouette algorithm; (4) using the collected photos and the generated three-dimensional proxy geometry to perform a physics-based deep learning model for the furry objects, and then to train the neural network; and (5) rendering RGB picture and the corresponding alpha from a new perspective using the trained model.

The present invention can model high-frequency furry objects based on images and achieve free-view rendering. Particularly, the present invention uses Neural Radiance Field to perform physical implicit representation of the object. By rendering the object represented by the neural network in each captured perspective for supervision through differentiable rendering, the real object representation may be obtained for training. Compared with existing methods, the present invention introduces a three-dimensional geometry that can be obtained from two-dimensional pictures to guide the learning of the network, thereby greatly accelerating the training process. In addition, a new patch-based neural radiance field may be adopted in some embodiments to overcome the shortcomings of the previous single-ray-based methods that cannot express high-frequency information. Finally, unlike other methods that require correct alpha map for supervision, the present invention implements a self-supervised training method without ground truth alpha map through the Generative Adversarial Network (GAN), which can improve the network's ability to express high-frequency information and predict a correct alpha at the same time. The present invention can not only model furry objects, but also achieve very good modeling and rendering results for other objects with rich high-frequency information.

FIG. 1 is an exemplary flow chart showing the hair rendering system pipeline 110 in accordance with one embodiment of the present invention. Referring to FIG. 1, the hair rendering system based on deep neural network disclosed in the present invention mainly includes the following steps.

In step 111, the dataset collection of furry objects may be obtained by capturing hundreds of photos of furry objects with an acquisition system, from a plurality of viewpoints.

In step 112, the cameras of the acquisition system may be calibrated. In one embodiment, Agisoft Metashape software may be used to calibrate the camera acquisition system according to the collected multi-view images, and to obtain the intrinsic and extrinsic parameters of the many virtual cameras generated by rotation.

In step 113, alpha images may be obtained by matting. In one embodiment, the alpha image may be converted into a 0-1 binary image, where the conversion method could be that pixels with non-zero values are set to 1. The binary image may be further expanded to obtain a mask that contains all real objects in each view.

In step 114, with the calibrated intrinsic and extrinsic parameters of the cameras and the masks, a rough three-dimensional proxy geometry may be obtained through the structure from silhouette technology. The proxy, the internal and external parameters of the cameras, together with the collected RGBA pictures may constitute the final dataset.

In step 115, depth map of each image may be obtained for neural network training. In one embodiment, the images may be divided into small patches according to the depth map.

In step 116, the deep neural network model may be trained with the captured multi-view photos.

In step 117, high quality images may be rendered for new viewpoints by using the trained deep neural network.

Figure 2:
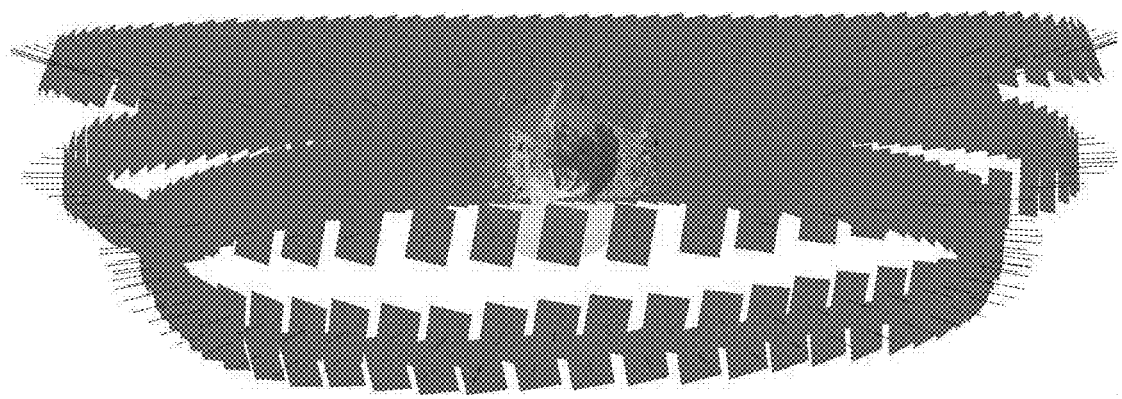
FIG. 2 is an exemplary diagram showing the capturing system in accordance with one embodiment of the present invention.

FIG. 2 is an exemplary diagram showing the capturing system used in step 111, in accordance with one embodiment of the present invention.

Referring to FIG. 2, the furry object to be photographed may be placed on a rotatable platform and in front of a green screen serving as the background. Five 16 mm C-mount cameras may be used to shoot images of the object, and another 8 mm camera may be used for camera calibration. When shooting, the cameras may be kept still while the object on the rotatable platform may be rotated, thereby achieving the effect of circular shooting. The capturing system may be used to take hundreds of sparse view photos and capture the corresponding background photos for the furry objects that need to be rendered. Subsequently, advanced automatic matting technology may be used to cut out the alpha mask picture from the corresponding angle of view, which may serve as the training data together with the RGB picture.

The present invention may be constructed based on the neural radiance field (NeRF) for the physics-based modeling of furry objects. NeRF is an implicit continuous expression of the scene in the form of a 5D function.

Figure 3:
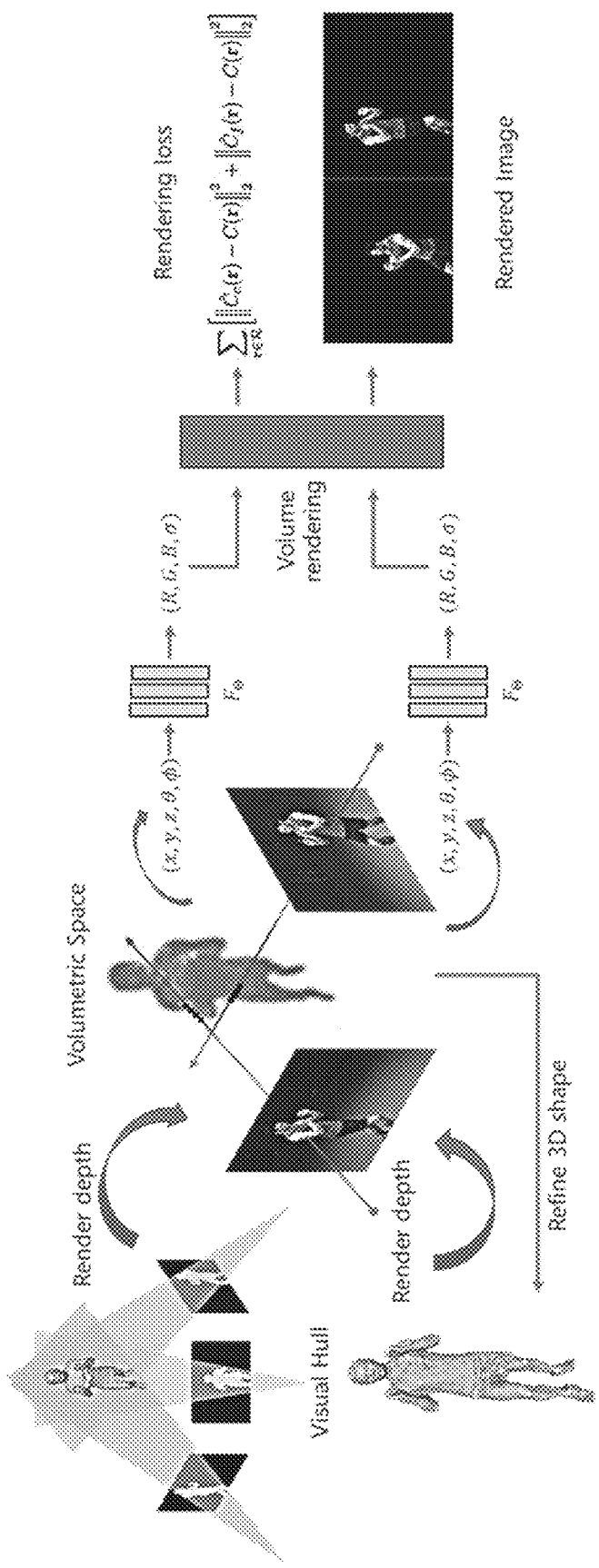
FIG. 3 is an exemplary diagram showing the accelerated neural radiance filed pipeline in accordance with one embodiment of the present invention.

FIG. 3 is an exemplary diagram showing the accelerated neural radiance filed pipeline in accordance with one embodiment of the present invention. Referring to FIG. 3, the input includes 3D location (x, y, z) and 2D perspective (θ, φ), and the output is the color corresponding to the 3D position c=(r, g, b) and the density a. A deep neural network multi-layer perceptron (MLP) may be used to fit the 5D function of NeRF utilized by the present invention. Through differentiable volume rendering, the final RGB images may be rendered with near bounds $t_n$ and far bounds $t_f$.

$$C(r)=\int_{t_n}^{t_f}T(t)\sigma(r(t))c(r(t),d) \quad (1)$$

wherein T(t) is the probability that a ray emitted from the near bound to terminated at t, and may be expressed as $T(t)=\exp(-\int_{t_n}^{t}\sigma(r(s))ds)$. In some embodiments, the alpha value of the pixel represented by the ray may be obtained through the accumulation of the T(t) along the ray direction: $T(r)=\int_{t_n}^{t_f}T(t)$.

The model represented by the implicit representation may be rendered in each captured perspective to supervise and optimize the deep neural network as disclosed in the present invention, so as to make the rendered images similar to the ground truth images as much as possible. The following L2 loss function may be used to train the network:

$$L_{NeRF}=L_2(C(r),C_{gt}) \quad (2)$$

Traditional NeRF only uses the RGB supervision as mentioned above. Although the alpha map can be predicted at the same time, noise exists where there is no object. In some embodiments of the present invention, alpha supervision may be added. Thus, the loss function may be modified as below:

$$L_{NeRF}=L_2(C(r),C_{gt})+L_2(T(r),\alpha(r)) \quad (3)$$

Even though the simple deep neural network MLP may be used, traditional neural radiance field has obvious problems. Due to the large-scale sampling, namely the number of light and sampling points that need to be trained being too large, both the training and rendering after the training are time-consuming. To solve this problem, a rough 3D proxy geometry may be introduced to avoid unnecessary sampling. Particularly, the structure from silhouette (SFS) algorithm may be adopted for the multi-view masks to obtain the rough 3D proxy.

The 3D proxy may be used to accelerate the training of NeRF. Referring to FIG. 3, the 3D proxy may be used to render depth map in each view. When training NeRF, only the rays with depth may be sampled. And for each ray with depth, only a small number of sampling points in the area near the depth may be sampled for training. Given the depth from the scene to a camera, the depth $d_s$ along a ray r where it hits the surface can be obtained. The corresponding near bounds $t_n$ and far bounds $t_f$ can be calculated by:

$$t_n=d_s-d_f*d_r$$

$$t_f=d_s+d_f(1-d_r) \quad (4)$$

wherein $d_f$ is the depth field which defines the sampling range and $d_r$ is the ratio of sampling point numbers in front of the surface to those behind the surface. These parameters may be used to guarantee that the real surface can be sampled because the depth is not precise. In some embodiments, $d_f$ and $d_r$ may be set to be the nearest depth and farthest depth rendered using the 3D proxy, respectively. In addition, stratified sampling approach may be used to sample each ray.

In accordance with embodiments of the present invention, almost same rendering quality may be achieved while using only one-tenth of the training and rendering time as compared with traditional NeRF.

The traditional NeRF model trains every single ray individually, and does not use spatial information (namely, the texture information of the captured two-dimensional pictures). Therefore, the traditional method is not very good in expressing scenes with rich high-frequency information such as in furry objects. In this regard, the concept of patch may be used. According to the depth map rendered in each perspective, the training images may be divided into many small patches where the depth is not none. Then the ray sampling may be performed in units of patches. Similarly, in order to allow the network to better express high-frequency information such as textures, a new perceptual loss function (vgg loss) may be introduced for supervision. Therefore, the loss function may be expressed as follows:

$$L=L_2(P_{gt},P_{pred})+L_{vgg}(P_{gt},P_{pred}) \quad (5)$$

wherein P represents the RGBA image patches. The present invention can enhance the expressive ability of network.

Even if the model is trained by patches, it still predicts RGBA information ray by ray and does not use spatial information. In order to further improve the model's ability to express high-frequency information and to render better alpha maps, a multi-layer UNet convolutional network may be used for the patch-based NeRF.

Figure 4:
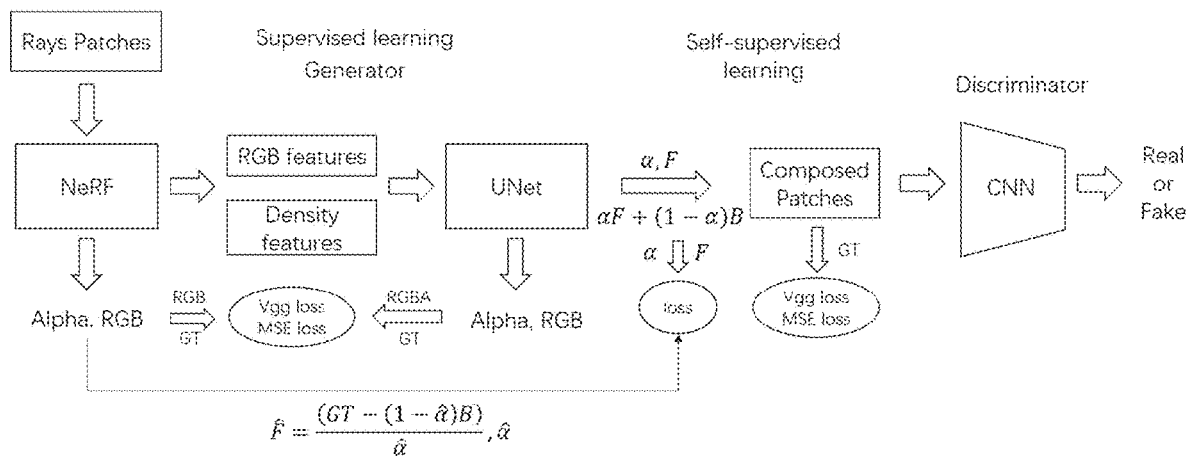
FIG. 4 is an exemplary diagram showing the self-supervised convolutional neural radiance filed pipeline in accordance with one embodiment of the present invention.

FIG. 4 is an exemplary diagram showing the self-supervised convolutional neural radiance filed pipeline in accordance with one embodiment of the present invention. Referring to FIG. 4, The input of the UNet network may be the feature map obtained by patch-based NeRF, from both the RGB head and the opacity head, while the output may be the corresponding RGBA image. Patch-based NeRF and UNet (referred as "Conv-NeRF") may be trained at the same time. Similarly, L2 loss and vgg loss may be used as loss functions:

$$L=L_{NeRF}+L_{UNet} \quad (6)$$

However, it is difficult to obtain alpha for real data as true and accurate as ground truth. Therefore, in some embodiments, a generative adversarial network (GAN) is proposed to achieve self-supervised training with only RGB images supervision. Referring to FIG. 4, Conv-NeRF may be used as a patch-based generator to render the RGB foreground image F and the corresponding alpha image a, through the formula I=αF+(1−α)B, for later combination with the background B to form a fake picture patch. Then the fake picture patches may be sent together with the real image patches to the convolution discriminator for adversarial training. The objective function for training of the entire network model may be modified as below:

$$L=L_{NeRF}+L_{UNet}+L_{GAN}$$

$$L_{GAN}=E_{x,y}[\log D(x,y)]+E_{x,z}[\log(1-D(x,G(x,z)))] \quad (7)$$

wherein the alpha supervision may be removed in the loss term $L_{NeRF}$ and $L_{UNet}$.

Although the self-supervised model can render very realistic RGB images with rich high-frequency information, the edges of the rendered alpha image are not very natural and sharp, and slight prediction errors would occur in positions where the color of objects is close to the background color. To address this problem, a deep context-aware matting model M may be adopted as teacher model (see Hou, Qiqi and F. Liu. "Context-Aware Image Matting for Simultaneous Foreground and Alpha Estimation." 2019 IEEE/CVF International Conference on Computer Vision (ICCV) (2019): 4129-4138). Then pseudo-supervision may be added between the alpha maps generated by the teacher model and the generator disclosed in some embodiments of the present invention. Thus, the loss function for the generator in the present invention may be the follows:

$$L=L_{NeRF}+L_{UNet}+\lambda L_2(\alpha_G,\alpha_M) \quad (8)$$

wherein the $\lambda$ is used to adjust the weight of pseudo-supervision.

In addition, to avoid the errors caused by the similarity between the foreground and background colors, the alpha predicted by the NeRF part where the value is equal to 1 may be directly used as the final alpha map. The adversarial model in the present invention can not only generate accurate alpha images, but also help the generator generate RGB images with richer textures.

After the training is complete, the discriminator may be removed and the generator may be kept. For a given new viewpoint, the 3D proxy may be first used to render the depth map under this viewpoint. Then the RGBD image may be sent together to the network model. And the RGBA image under this viewpoint may be render.

Compared with all existing methods, the present invention can effectively express furry objects, and can render high-quality hair pictures with rich high-frequency information and corresponding alpha pictures in a short time (less than 3 seconds). Compared to traditional graphics pipeline, the present invention saves significant manpower and time. In addition, the present invention can effectively model and render other objects with high-frequency information.

What is claimed is:

1. A method of rendering an object, comprising:
    capturing a plurality of images of the object from a plurality of views;
    obtaining an alpha mask for each of the plurality of images;
    obtaining a 3D proxy geometry through a structure from a silhouette algorithm;
    rendering a depth map for each of the plurality of images using a 3D proxy;
    training a neural radiance field-based (NeRF-based) deep neural network with images with depth; and
    rendering a plurality of images for a plurality of new views.

2. The method according to claim 1, further comprising:
    training the NeRF-based deep neural network with pixels in an area of the image with depth.

3. The method according to claim 2, wherein a near bound $t_n$ and a far bound $t_f$ of the area is calculated by:

$$t_n=d_s-d_f*d_r;\ t_f=d_s+d_f(1-d_r),$$

wherein $d_s$ is the depth of the image, $d_f$ is a sampling range, and $d_r$ is a ratio of sampling numbers.

4. The method according to claim 3, wherein $d_f$ and $d_r$ are set based on a nearest depth and farthest depth rendered using the 3D proxy.

5. The method according to claim 2, wherein the pixels in the images with depth used in training comprises no more than 10% of the pixels in the plurality of images.

6. The method according to claim 1, further comprising:
    dividing the images with depth into a plurality of patches; and
    training NeRF-based deep neural network with the images with depth in the patch with a perceptual loss function for supervision.

7. The method of according to claim 1, further comprising:
    training the NeRF-based deep neural network using a red-green-blue (RGB) supervision and an alpha supervision using a loss function.

8. The method of according to claim 1, wherein the NeRF-based deep neural network comprises a multi-layer UNet convolutional network.

9. The method according to claim 1, wherein the NeRF-based deep neural network comprises a generative adversarial network, and the method further comprises:
    training the generative adversarial network using a RGB supervision using a loss function.

10. The method according to claim 9, further comprising:
    training the generative adversarial network using the RGB supervision and a pseudo-supervision using the loss function.

11. The method according to claim 1, wherein the object comprises hair.

12. A device for rendering an object, comprising:
    a processor; and
    a memory configured with computer instructions executable by the processor, wherein, upon being executed by the processor, the computer instructions cause the processor to perform operations, comprising:
        obtaining an alpha mask for each of a plurality of images captured of the object from a plurality of views;
        obtaining a 3D proxy geometry through a structure from a silhouette algorithm;
        rendering a depth map for each of the plurality of images using a 3D proxy;
        training a NeRF-based deep neural network with images with depth; and
        rendering a plurality of images for a plurality of new views.

13. The device according to claim 12, wherein the operation of training the NeRF-based deep neural network with the images with depth comprises:
    training the NeRF-based deep neural network with pixels in an area of the image with depth.

14. The device according to claim 13, wherein a near bound $t_n$ and a far bound $t_f$ of the area is calculated by:

$$t_n=d_s-d_f*d_r;\ t_f=d_s+d_f(1-d_r),$$

wherein $d_s$ is the depth of the image, $d_f$ is a sampling range, and $d_r$ is a ratio of sampling numbers.

15. The device according to claim 14, wherein $d_f$ and $d_r$ are set based on a nearest depth and farthest depth rendered using the 3D proxy.

16. The device according to claim 13, wherein the pixels in the images with depth used in training comprises no more than 10% of the pixels in the plurality of images.

17. The device according to claim 12, wherein the operation of training the NeRF-based deep neural network with the images with depth comprises:
    dividing the images with depth into a plurality of patches; and
    training the NeRF-based deep neural network with the images with depth in the patch with a perceptual loss function for supervision.

18. The device according to claim 12, wherein training the NeRF-based deep neural network with the images with depth comprises:
    training the NeRF-based deep neural network using a RGB supervision and an alpha supervision using a loss function.

19. The device of according to claim 12, wherein the NeRF-based deep neural network comprises a multi-layer UNet convolutional network.

20. The device of according to claim 12, wherein the NeRF-based deep neural network comprises a generative adversarial network, and the operation of training the NeRF-based deep neural network with the images with depth comprises:
   training the generative adversarial network using a RGB supervision using a loss function.

21. The device according to claim 20, wherein the operation of training the NeRF-based deep neural network with the images with depth comprises:
   training the generative adversarial network using the RGB supervision and a pseudo-supervision using the loss function.

22. The device according to claim 12, wherein the object comprises hair.

* * * * *